United States Patent
Nair et al.

(10) Patent No.: US 6,370,270 B1
(45) Date of Patent: Apr. 9, 2002

(54) SYSTEM AND METHOD FOR SAMPLING AND/OR PLACING OBJECTS USING LOW DISCREPANCY SEQUENCES

(75) Inventors: Dinesh Nair, Austin; Lothar Wenzel, Round Rock; Nicolas Vazquez; Samson DeKey, both of Austin, all of TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/385,121

(22) Filed: Aug. 27, 1999

Related U.S. Application Data

(63) Continuation-in-part of application No. 09/227,508, filed on Jan. 6, 1999.

(51) Int. Cl.[7] .................................................. G06K 9/62
(52) U.S. Cl. ....................................... 382/209; 707/526
(58) Field of Search ................................ 382/209, 215, 382/217, 218, 219, 220, 161, 228, 141, 112; 707/526, 527, 523, 541

(56) References Cited

U.S. PATENT DOCUMENTS

| | | | | |
|---|---|---|---|---|
| 5,594,809 A | * | 1/1997 | Kopec et al. | 382/161 |
| 5,652,804 A | * | 7/1997 | Bronstein et al. | 382/141 |
| 5,940,810 A | * | 8/1999 | Traub et al. | 705/36 |
| 5,963,213 A | * | 10/1999 | Guedalia et al. | 345/425 |
| 6,016,487 A | * | 10/1999 | Rioux et al. | 707/2 |

OTHER PUBLICATIONS

"Numerical Recipes in Fortran 77: The Art of Scientific Computing" (ISBN 0–521–43064–X) pp. 299–306, Copyright 1986–1992.

William H. Press, Saul A.Teukolsky, William T.Vetterling and Brian P. Flannery, "Numerical Recipes in C, The Art of Scientific Computing", Second Edition, 1992, Cambridge University Press, pp. 309–314.

"Monte Carlo Extension of Quasi–Monte Carlo", Art B. Owen, Dept. of Statistics, Stanford University, 1998, 7 pages.

"Faster Evaluation of Multidimensional Integrals", A.. Papageorgiou and J. F. Traub, Dept. of Computer Science, Columbia University, NY, Jun. 1997, pp. 1–9.

"Scrambling Sobol and Niederreiter–Xing Points", Art B. Owen, Stanford University, Dec. 1997, pp. 1–25.

"Quasi–Random Sequences and Their Discrepancies" William J. Morokoff and Russel E. Caflisch, Mathematics Department, UCLA, Jul. 21, 1994, pp. 1–44.

* cited by examiner

*Primary Examiner*—Andrew W. Johns
*Assistant Examiner*—Seyed Azarian
(74) *Attorney, Agent, or Firm*—Conley, Rose & Tayon, PC; Jeffrey C. Hood

(57) ABSTRACT

A system and method for improved image characterization, object placement, and mesh design utilizing Low Discrepancy sequences. The Low Discrepancy sequence is designed to produce sample points which maximally avoid one another, i.e., the distance between any two sample points is maximized. The invention may be applied specifically to methods of image characterization, pattern matching, acquiring image statistics, object location, image reconstruction, motion estimation, object placement, sensor placement, and mesh design, among others. Image characterization is performed by receiving an image and then sampling the image using a Low Discrepancy sequence, also referred to as a quasi-random sequence, to determine a plurality of sample pixels in the image which characterize the image. Sensor placement is performed by generating a Low Discrepancy sequence for the desired placement application, and then selecting locations for the optimal placement of sensors using the generated Low Discrepancy sequence.

46 Claims, 11 Drawing Sheets

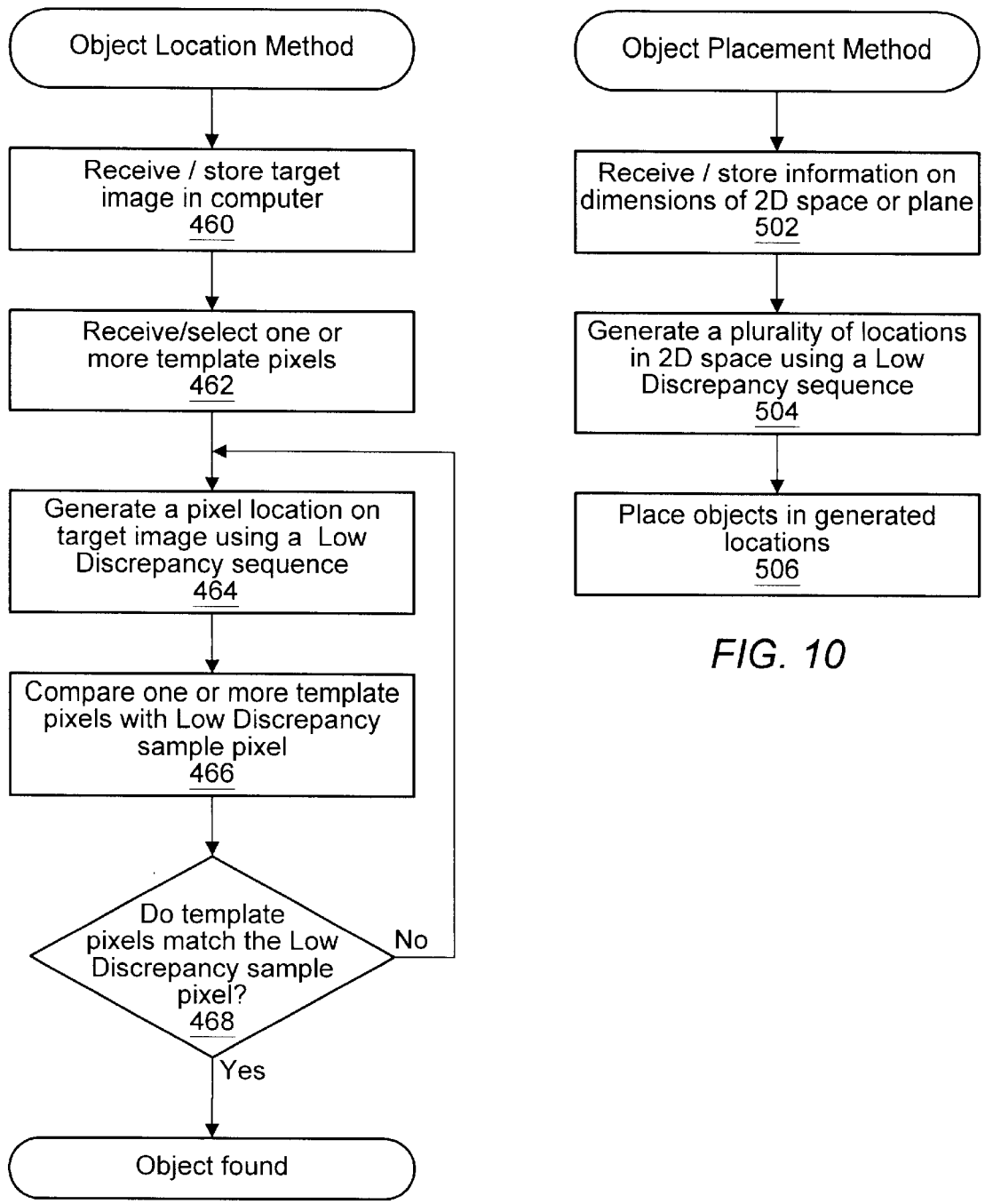

SYSTEM AND METHOD FOR SAMPLING AND/OR PLACING OBJECTS USING LOW DISCREPANCY SEQUENCES

CONTINUATION DATA

This is a continuation-in-part of U.S. patent application Ser. No. 09/227,508 titled "Pattern Matching System and Method with Improved Template Image Sampling Using Low Discrepancy Sequences" and filed Jan. 6, 1999, whose inventors were Dinesh Nair, Lothar Wenzel, Nicolas Vazquez, and Samson DeKey.

FIELD OF THE INVENTION

The present invention relates to applications involving sampling of objects, such as images, or placement or arrangement of objects, such as sensors, using Low Discrepancy sequences, wherein the use of Low Discrepancy sequences provides improved efficiency. The present invention includes, but is not limited to, methods for sampling images, acquiring image statistics, locating a known object in an image, estimating the motion of objects in successive acquired images, determining placement locations of sensors or other objects, and determining points to be used in a grid/mesh design.

DESCRIPTION OF THE RELATED ART

In many applications it is necessary or desired to sample an image to generate sample pixels which characterize the image, rather than using every pixel of the image. These sample pixels can then be used in performing calculations and comparisons associated with the image. Sampling an image may be very advantageous in applications such as pattern matching, image reconstruction, and motion estimation.

In addition, many applications require placement of multiple objects, such as sensors, within a given area. Here it is greatly desirable to optimally place the sensors for best coverage of the area, i.e., to place the sensors in locations which maximize reception. This allows usage of a lesser number of sensors to cover an area, thus reducing cost.

Prior art techniques for sampling an image and for determining placement locations for objects have utilized either a homogeneous sampling, such as grid-based sampling, or have utilized random points or pixels within the placement or image area. However, each of the above prior art techniques operates to select a subset of the total available pixels or total possible locations which does not necessarily best represent or characterize the image or placement objectives.

For example, an improved system and method is desired for characterizing an image with a fewer number of sample pixels. Image characterization is used, for example, in performing correlation based pattern matching. Pattern matching applications often apply an image sampling method to characterize the temple image with a lesser number of sample pixels. Pattern matching applications are used to find instances of the template image or image object in a larger target image. Examples of pattern matching applications include machine vision applications such as process monitoring, feedback control, and laboratory automation; image and video compression; and jitter compensation in video cameras; among others.

Many other operations require and/or desire a more efficient characterization of images. Examples include methods of acquiring image statistics, such as mean gray-level value or standard deviation of gray-levels, methods for locating a known object in an image, methods for estimating the motion of objects in successive acquired images, and methods for color matching, among others. Therefore, an improved system and method is desired for characterizing an image. More particularly, an improved system and method is desired for characterizing or selecting samples or pixels from a template image which best represent the template image with the fewest samples possible.

As discussed above, in many applications it is desired to determine the optimal placement locations for sensors within a given area. For example, a CCD (charge coupled device) sensor in a camera comprises an array of light sensitive electronic capacitors (CCD sensor elements) that are typically placed in a grid based pattern. If fewer CCD sensors elements could be used, the cost of the CCD sensor would be lessened. Placement of CCD sensor elements according to a uniform grid or random placement procedure may not provide the optimal locations for the sensors. Therefore an improved method is desired for determining the placement locations for CCD sensor elements. Other applications where the optimal placement of sensors is desired include the placement of temperature sensors and microphones in a planar array, as well as placement of transmitters/receivers (sensors) for radar, sonar, topography, and magnetic resonance imaging applications.

Meshes are used in many engineering applications including mechanical, structural, and design applications. Prior art methods typically use a grid based mesh, wherein the vertices of the mesh are placed according to a grid pattern. If a fewer number of vertices is used, while achieving substantially the same results, computer memory, time, and other resources are reduced. Therefore an improved method for determining mesh vertices is desired.

Therefore, improved systems and methods are desired for optimally sampling objects, such as pixels in an image; for optimally placing or arranging objects, such as sensors; and for optionally determining locations of vertices in a grid or mesh design.

SUMMARY OF THE INVENTION

The present invention comprises a system and method for improved image characterization, object placement, and mesh design utilizing Low Discrepancy sequences. The present invention may be applied specifically to methods of image characterization, pattern matching, acquiring image statistics, object location, image reconstruction, motion estimation, object placement, sensor placement, and mesh design, among others. While these applications are discussed specifically and in detail, they are not intended to limit the use of Low Discrepancy sequences in other applications.

In a first embodiment, the present invention comprises a system and method for performing image characterization using Low Discrepancy sequences. The image characterization is preferably performed in a computer system. The image is received by and/or stored in the computer system and comprises a first plurality of pixels. The system and method comprises sampling the image using a Low Discrepancy sequence, also referred to as a quasi-random sequence, to determine a plurality of sample pixels in the image which characterize the image. The Low Discrepancy sequence is designed to produce sample points which maximally avoid one another, i.e., the distance between any two sample points is maximized. Also, the Low Discrepancy sequence sampling results in fewer points and provides a better characterization of the image than a random sequence sampling or a uniform sampling. Examples of the Low Discrepancy sequence include Halton, Sobol, Faure, and Niederreiter sequences.

Pattern matching is one embodiment in which image characterization using Low Discrepancy sequences may provide a significant increase in efficiency. In a pattern matching application, a template image is received and/or stored in the computer system and comprises a first plurality of pixels. According to one pattern matching embodiment, the system and method first comprises sampling the template image using a Low Discrepancy sequence, as described above. The sampling or characterization of the template image is preferably performed off-line prior to receipt of a target image. Thus the sampling or characterization of the template image is preferably not constrained by real time requirements. After the template image is sampled or characterized, the target image is preferably acquired by the computer system, through a camera or any other image capture method. The method then performs pattern matching using the sample pixels of the template image and the target image to determine zero or more locations of the template image in the target image.

Image characterization using Low Discrepancy sequences may also be used in other applications, such as acquiring image statistics, locating a known object in an image, estimating motion vectors indicating movement of objects in successive images, image reconstruction, image compression, and color matching, among others.

In a second embodiment, the present invention comprises a system and method for optimally placing sensors in a 2D array. In this embodiment, a computer system generates a Low Discrepancy sequence for the desired placement application. The computer system then selects locations for the optimal placement of sensors using the generated Low Discrepancy sequence.

In one embodiment of the present invention, a placement method for CCD sensor elements using a Low Discrepancy sequence may enable a CCD sensor to receive substantially similar sensory information (as that from a grid based array of CCD sensor elements) while reducing the number of CCD sensor elements required. In this embodiment, the area of the CCD sensor panel (the area in which the CCD sensor elements will be placed) and the number of desired CCD sensor elements may first be received by the computer system. This information may either be calculated by the computer or entered by the user, or obtained in any other manner. The computer then generates a Low Discrepancy sequence based on this information to determine the desired CCD sensor element locations on the CCD sensor panel. The generated locations represent the optimal locations for the desired number of CCD sensor elements. The CCD sensor is then constructed, wherein the sensor elements are placed at the locations indicated by the Low discrepancy sequence. The CCD sensor may be constructed by a user or by a machine, e.g., robotics.

The system and method of the present invention may be used for optimally placing other objects or sensors within a 2D or 3D array, such as placement of temperature sensors and microphones in a planar array, as well as placement of transmitters/receivers (sensors) for radar, sonar, topography and magnetic imaging applications, among others.

In a third embodiment, the system and method of the present invention may be used to create meshes using Low Discrepancy sequences. Meshes are used by many engineering applications including mechanical, structural, and design applications. The present invention can be used to optimally create the mesh design, thus achieving improved results and/or improved efficiency.

BRIEF DESCRIPTION OF THE DRAWINGS

A better understanding of the present invention can be obtained when the following detailed description of the preferred embodiment is considered in conjunction with the following drawings, in which:

FIG. 9 is a flowchart illustrating a method of locating an object within an image using a Low Discrepancy sequence;

FIG. 10 is a flowchart illustrating a method of placing objects within a determined spatial area using a Low Discrepancy sequence;

DETAILED DESCRIPTION OF THE PREFERRED EMBODIMENT

The present invention comprises a system and method for performing image characterization using Low Discrepancy sequences, for producing optimal object placement locations using Low Discrepancy sequences and for producing effective mesh designs using Low Discrepancy sequences.

Figure 1:
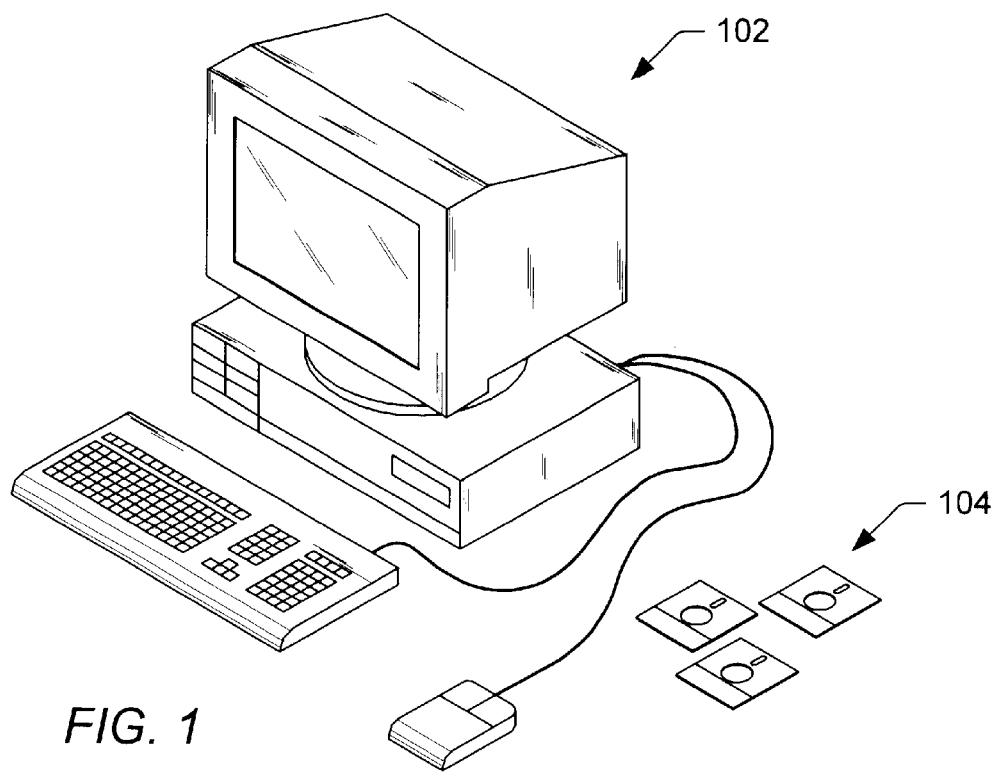
FIG. 1 illustrates a computer system which may be used for image characterization or sensor placement according to the present invention.

FIG. 1—Computer System

FIG. 1 illustrates a computer system 102 which may be used according to the present invention. The computer system 102 may be used, for example, to perform image characterization, pattern matching, generation of image statistics, image location, and motion estimation, using Low Discrepancy sequences. The computer system 102 may also be used to perform object or sensor placement, such as for CCD sensor elements, microphones, temperature sensors, etc., using Low Discrepancy sequences. The computer system 102 may further be used to determine vertex locations in a grid or mesh design. The computer system 102 comprises one or more processors, a memory, a display, and an input such as a keyboard or mouse, and any other components necessary for a computer system.

The present invention is preferably implemented by one or more software programs stored on a memory medium of the computer system and executed by a processor of the computer system. The term "processor" is intended to include various types of processors, CPUs, DSPs, microcontrollers, or programable logic, among others. The term "memory medium" is intended to include various types of memory or storage, including an installation medium, e.g., a CD-ROM, or floppy disks 104, a computer system memory such as DRAM, SRAM, EDO RAM, Rambus RAM, etc., or a non-volatile memory such as a magnetic media, e.g., a hard drive, or optical storage. The memory medium may comprise other types of memory as well, or combinations thereof In addition, the memory medium may be located in a first computer in which the programs are executed, or may be located in a second different computer which connects to the first computer over a network. In the latter instance, the second computer provides the program instructions to the first computer for execution.

Also, the computer system 102 may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The software program may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A processor executing code and data from the memory medium comprises a means for sampling and/or placing objects according to the methods or flowcharts described below.

The computer system 102 is operable to calculate Low Discrepancy sequences and use these sequences for sampling pixels of an image (image characterization) or for determining locations or placement of objects or sensors (sensor placement), or for determining vertex locations in a mesh design.

Low Discrepancy sequences comprise mathematical sequences that are efficient samples of high dimensional spaces. A Low Discrepancy sequence is also referred to as a quasi-random sequence or a sub-random sequence. The Low Discrepancy sequence is designed to produce sample points or locations which maximally avoid each other, e.g., is designed to produce sample pixels which best represent an image or points/locations which best cover an area. Examples of Low Discrepancy sequences include the Halton sequence, the Sobol sequence, the Faure sequence and the Niederreiter sequence, wherein differences between these are minor from a real world applications point of view. Sampling an image using a Low Discrepancy sequence results in fewer sample pixels to characterize the image and/or a better characterization of the image than would a random sampling technique or a uniform sampling technique. Determining object or sensor placement using a Low Discrepancy sequence results in improved or optional coverage of an area with a minimal number of objects or sensors.

The following is an example of the generation or operation of a Low Discrepancy sequence (Halton set).

First, at step 1 the method selects the type of Low Discrepancy sequence, e.g., Halton, 2d (2-dimensional). In general, mathematicians are interested in nd applications of low-discrepancy sets where n>10, sometimes n>100. However, for a 2-dimensional application, a 2d sequence is used.

At step 2 the method then selects a criteria for construction of the Halton set, for example, construction in the unit square $[0,1] \times [0,1]$, it being noted that the general case can be derived by a scaling operation.

At step 3 the method then selects two prime numbers p and q. It is very common to use p=2 and q=3, although this is not necessary. Every pair of (p,q) results in a slightly different Halton set, wherein all of these sets are equivalent.

The variables $(x_n, y_n)$ denote the nth element of the Halton set. Given n, at step 4 the method notates n in the p-ary system (in the case where p=2 it is the well-known binary system). The result is $n = a_k, \ldots a_1, a_0$ where the a's are 0 or 1 in case of the binary system, but $0, 1, \ldots, p-1$ in the general case.

At step 5, the method then reverses the order of $a_k, \ldots a_1, a_0$. This results in $a_0, a_1, \ldots, a_k$.

At step 6 the method then adds the (n-ary) point, i.e. $0.a_k \ldots a_1 a_0$. This number is in between 0 and 1 and represents the x-component of the nth Halton point (xn,yn).

At step 7 the method repeats steps (4)–(6) based on the other number system q. This produces the y-component.

After steps 1–7, the nth point of the Halton sequence has been constructed.

The following is an example of the construction of a Low Discrepancy sequence in 2d. Here it is assumed that P=2 and q=3. This example determines the 10th element, i.e., $(x_{10}, y_{10})$.

The method starts with the x-component as follows:

(4') 10=1010 (decimal=binary) because 10=1*8+0*4+1*2+0*1

(5') reverse the order->0101

(6') add the point->x10=0.0101 (0.0101 can be translated into 0*(1/2)+1*(1/4)+0*(1/8)+1*(1/16)=1/4+1/16=5/16

Now the y-component is computed as follows:

(4") 10=101 (decimal=binary) because 10=1*9+0*3+1*1

(5") reverse the order->101

(6") add the point->y10=0.101 (0.101 can be translated into 1*(1/3)+0*(1/9)+1*(1/27)=10/27

Two important advantages of Low Discrepancy sequences are that 1) the generated sequence values are designed to maximally avoid each other, thus providing optional sampling and object placement; and 2) each additional element of the sequence may deliver the optimal location of the next element. In many cases, a relatively small number of samples may be sufficient to produce good approximations. These advantages will be seen as multiple embodiments of the image characterization and object placement methods are described.

For more information on Low Discrepancy sequences, please see "Numerical Recipes in Fortran 77: The Art of Scientific Computing" (ISBN 0-521-43064-X) Cambridge University Press, pgs.299–306, which is hereby incorporated by reference as though fully and completely set forth herein.

Figure 2:
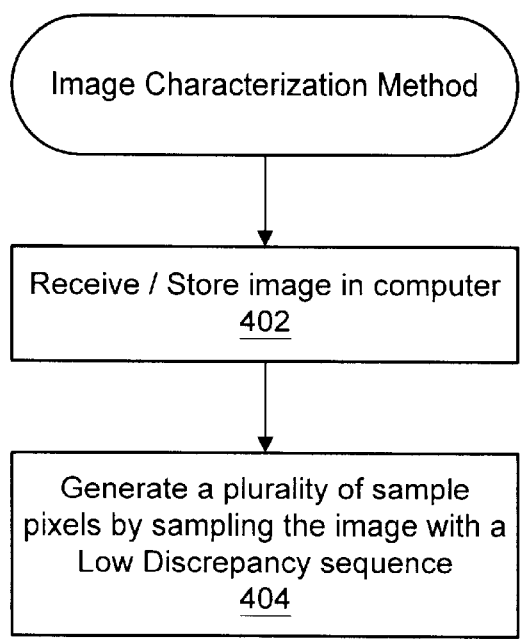
FIG. 2 is a flowchart illustrating a method of image characterization using a Low Discrepancy sequence.

FIG. 2—Image Characterization Method

FIG. 2 is a flowchart illustrating an image characterization system and method for representing an image with a reduced number of pixel values according to the present invention. The method shown in FIG. 2 may be used to characterize or represent an image for any of various different types of applications including, but not limited to, pattern matching, image statistics, object location, image reconstruction, and motion estimation.

As shown, in step 402 an image is received by or stored in the computer system 102. The image may be received from any of various sources, as desired. For example, the image may be received over a network, or may have been previously stored on the computer. The image preferably comprises a plurality of pixels (or sub-pixels).

In step 404 the image is characterized or sampled to represent the image using less than all of the total image pixels. In other words, the image pixels are sampled according to a Low Discrepancy sequence, i.e., are sampled at pixel locations identified by a Low Discrepancy sequence. These sample pixels are stored in the computer system 102 and are useable to represent the image using a fewer number of pixels. In step 404, the computer 102 may operate to generate a Low Discrepancy sequence, and then sample pixels in the image based on the generated Low Discrepancy sequence.

The number of sample pixels generated may be selected by a user or may be selected by the computer according to some desired accuracy metric. In one embodiment, the computer 102 receives user input indicating the desired number of samples and/or the desired granularity, and the computer 102 generates at least one Low Discrepancy sequence based on the user input. This user input may be received before or after the image is received in step 402. Alternatively, the computer 102 has pre-calculated and stored a Low Discrepancy sequence which is used in sampling the image. In this instance, the computer 102 may select a number of sequence elements in a pre-calculated Low Discrepancy sequence based on received user input.

Figure 2A:
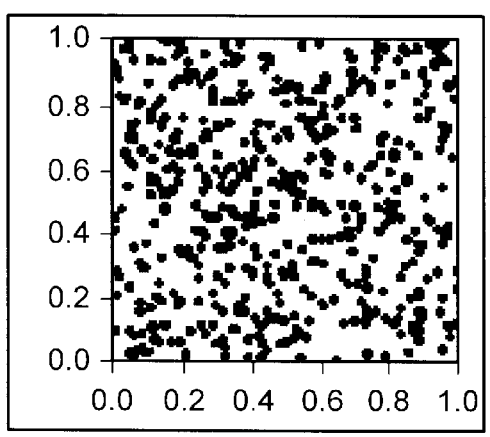
FIG. 2A is a graph illustrating an array of randomly selected coordinates on a 2D grid.
Figure 2B:
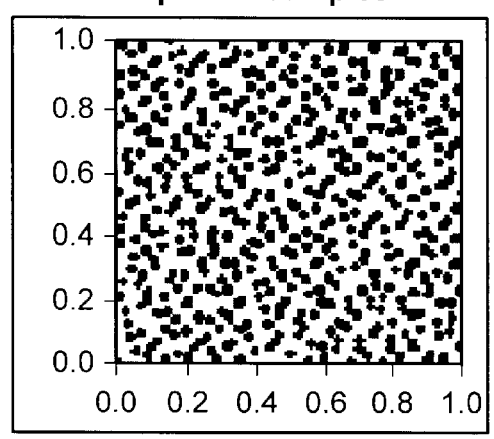
FIG. 2B is a graph illustrating an array of coordinates selected by a Low Discrepancy sequence on a 2D grid.

FIGS. 2A and 2B illustrate the difference between randomly selected sample pixels and sample pixels selected based on a Low Discrepancy sequence. The series of randomly selected sample pixels contains many clumps of sample pixels. Because each location is generated randomly, a random placement method does not take in to account prior random locations, and therefore, random sequences may not fill gaps appropriately. In contrast, the sample pixels generated by a Low Discrepancy sequence are positioned to maximally avoid one another. This means that each subsequent sample pixel location is placed in the largest available gap, achieving maximal avoidance by every sample pixel. In other words, every sample pixel is as far away from all other sample pixels as possible.

The image characterization system and method of the present invention may be used in a number of different applications, including various types of machine vision systems, e.g., industrial automation, robotic vision, traffic analysis, and image or video compression, such as MPEG compression, among others.

Figure 3:
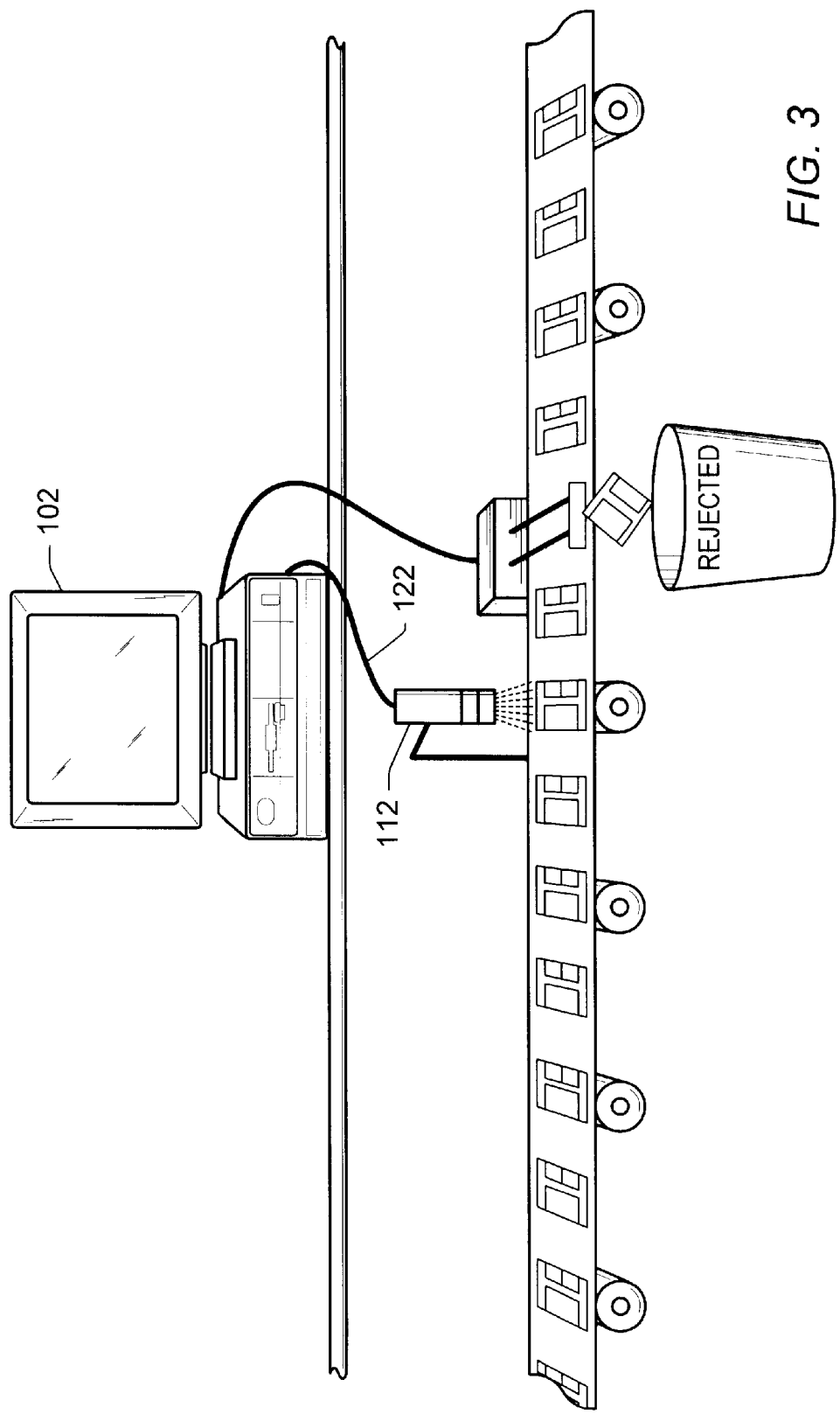
FIG. 3 illustrates an image acquisition or video capture system according to one embodiment.

FIG. 3—Machine Vision System

FIG. 3 illustrates a machine vision application, wherein the computer system 102 is coupled to a camera 112 via cable 122 and operates to receive an image and perform image characterization and/or analysis. The computer system of FIG. 3 may be programmed according to the present invention to characterize or represent a received image with a number of sample pixels, wherein the number of sample pixels is less than the total number of pixels in the image. The computer system 102 may also be programmed to perform other operations using the sample pixels, such as pattern matching, image statistic generation, image reconstruction, motion estimation, or object location. These techniques may be used in various types of machine vision applications. For example, the computer 102 may be embodied in various form factors and/or architectures, e.g., a robot or embedded device, among others. It is also noted that the image characterization, pattern matching, image reconstruction, object location, image statistic generation, and any other techniques of the present invention may be performed in any of various manners, either in software, programmable logic, or hardware, or a combination thereof.

Figure 4:
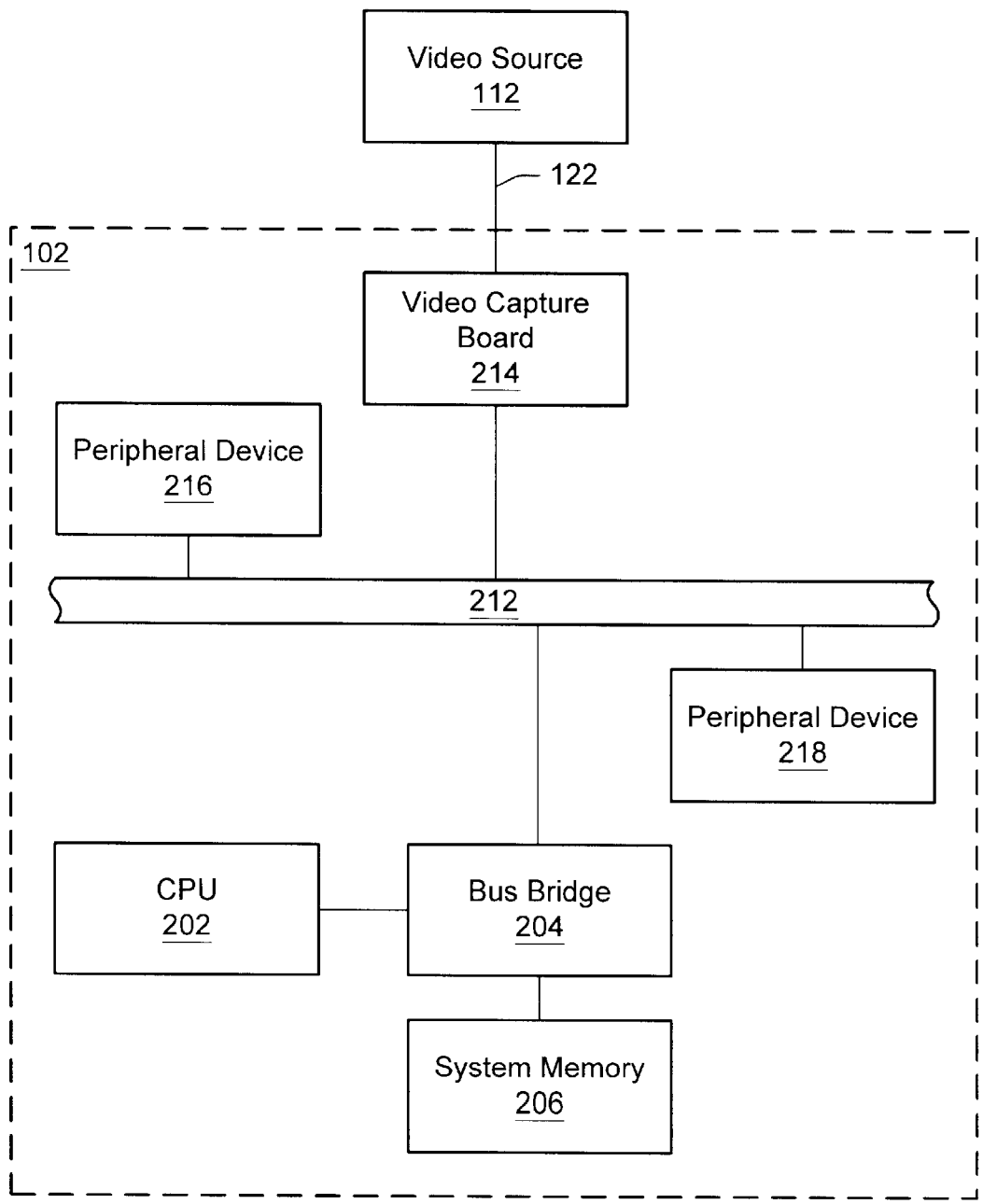
FIG. 4 is a high-level block diagram of the image acquisition system.

FIG. 4—Video Capture System Block Diagram

FIG. 4 is a high-level block diagram illustrating one system for acquiring an image for sampling. It is noted that the block diagram of FIG. 4 is exemplary only, and other computer system architectures may be used as desired. The present invention may be implemented in a "smart camera", for example, which integrates a sensor, analog to digital (A/D) converter, CPU and communications devices together in a single unit. The present invention may be embodied in other devices, architectures or embodiments, as desired.

FIG. 4 illustrates the host computer 102 coupled to video source 112. As shown in FIG. 4, the host computer 102 preferably comprises a CPU 202, a Bus Bridge 204, system memory 206, and a peripheral bus 212. The CPU 202 is coupled to the Bus Bridge 204. The Bus Bridge 204 is coupled to the system memory 206 and the CPU 202, and couples to the peripheral bus 212. In the preferred embodiment, the peripheral bus 212 is the PCI expansion bus, although other types of buses may be used.

In this embodiment, the host computer system 102 also includes a video capture board 214 which is adapted for coupling to the video source 112. The video capture board 214 is preferably coupled to the peripheral bus 212. In addition to the video capture board 214, other peripheral devices (216 and 218) may be coupled to the peripheral bus 212, such as audio cards, modems, graphics cards, network cards, etc.

The video source 112 supplies the digital video signals to the video capture board 214. The video capture board 214 transfers the digitized video frames to the system memory 206 through peripheral bus 212 and Bus Bridge 204. In this embodiment, the video capture board 214 acquires the target image and transfers the target image to system memory 206.

The system memory 206 may store an image or pattern, such as a template image or sample pixels generated from the template image. The system memory 206 also may store software according to the present invention which operates to generate Low Discrepancy sequences, such as Halton or Sobol sequences. The software may be executable to sample or characterize an image, perform pattern matching, acquire image statistics, reconstruct images, and perform motion estimates. The software may also be executable to determine object placement locations, create a mesh, and perform other applications using Low Discrepancy sequences according to the present invention. These applications are discussed further below.

The present invention is preferably implemented in one or more software programs which are executable by a processor or CPU. The software program(s) of the present invention are preferably stored in a memory medium, as described above, such as system memory 206.

Figure 5:
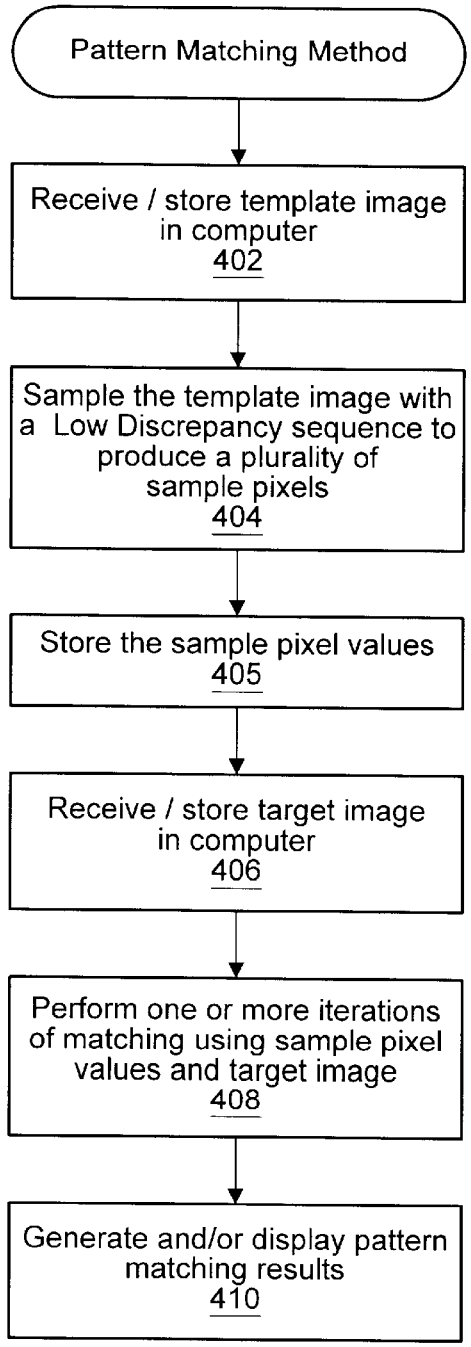
FIG. 5 is a flowchart illustrating a pattern matching method using a Low Discrepancy sequence.

FIG. 5—Pattern Matching Using Low-Discrepancy Sampling

FIG. 5 is a flowchart diagram illustrating operation of a pattern matching method of the present invention. Pattern matching may be executed at a much more efficient rate and with fewer sample pixels using Low Discrepancy sampling methods rather than random or grid based sampling. The purpose of pattern matching is to find instances of a template image within a target image or region of interest (ROI). The present invention provides an improved method for performing pattern matching on a computer system 102.

In step 402 the computer receives and/or stores the template image in the computer, through video capture or any other method. In step 404 the template image is sampled using a Low Discrepancy sampling method, as described in FIG. 2. In other words, a Low Discrepancy sequence is generated or used in selecting pixels, referred to as sample pixels, which represent the image. The sample pixels are stored in the computer memory in step 405.

In step 406 the target image is received and/or stored in the computer system. In the embodiment of FIG. 3, the target image is received from the camera 112. However, as noted above, the target image may be received from any of various sources, as desired. The target image is usually significantly larger than the template image.

In step 408 pattern matching is performed using the sample pixels stored in memory in step 405 to find zero or more instances of the template image in the target image. In the preferred embodiment, the sample pixels determined in step 404 are iteratively compared with selected portions of the target image, preferably using a 2D correlation technique, to find matches and hence to determine instances or locations of the template image in the target image The pattern matching may use a computed step size to step across the image and/or use a coarse to fine search method for improved efficiency.

In another embodiment, this method of step 408 is implemented using a series of iterations beginning with an iteration using a coarse template (i.e. less sample pixels) and subsequently performing iterations using an increasingly fine (i.e. more sample pixels) template. Possible matches are preferably stored in memory so that future iterations may apply the more fine template samples to only those areas, instead of the entire target image. This allows a quick response as to possible matches, while still allowing more precise matches to be determined. In this embodiment, a user may be able to view the results of each subsequent iteration and determine when the desired degree of certainty is met.

In many applications, it is necessary or desired to perform the pattern matching in real time when the target image is acquired. In machine vision applications, "real time" often refers to "video real time", i.e., to performing the function for every single image acquired by the camera, e.g., for a NTSC camera that acquires 30 frames/second. For example, in the machine vision embodiment shown in FIG. 3, the pattern matching is preferably performed in real time when the target image is acquired by the camera 112. However, in these real time embodiments, the template image is typically pre-stored in the computer 102, and there is generally a large amount of time in which to characterize or process the template image to produce the sample pixels. Once the sample pixels have been generated, the system can perform the pattern matching method a plurality of times for a plurality of acquired target images, preferably in real time. Thus, the sample pixels may be generated and stored in steps 404 and 405 prior to receipt of the target image in step 406.

In step 410 the pattern matching results are generated, preferably providing an indication of the location(s) of the template image in the target image. The pattern matching method may also provide information on the orientation, size, and other information of the located template image.

It is noted that steps 406–410 may be performed a plurality of times for a plurality of acquired target images. For more information on various pattern matching methods, please see related co-pending applications Ser. No. 09/227,508 titled "Pattern Matching System and Method with Improved Template Image Sampling Using Low Discrepancy Sequences", filed Jan. 6, 1999, whose inventors are Dinesh Nair, Lothar Wenzel, Nicolas Vazquez, and Samson DeKey; U.S. patent application Ser. No. 09/227,506 titled "Improved Pattern Matching System and Method" filed Jan. 6, 1999, whose inventors are Dinesh Nair, Lothar Wenzel, Nicolas Vazquez, and Samson DeKey; and U.S. patent application Ser. No. 09/227,507 titled "Rotation Invariant Pattern Matching System and Method", filed Jan. 6, 1999, whose inventors are Dinesh Nair, Lothar Wenzel, Nicolas Vazquez, and Samson DeKey, which are all hereby incorporated by reference.

Figure 6:
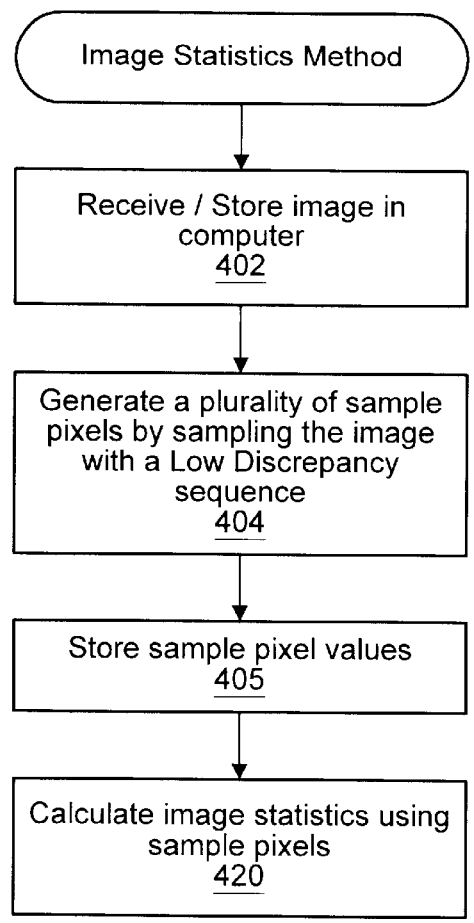
FIG. 6 is a flowchart illustrating a method of acquiring image statistics using a Low Discrepancy sequence.

FIG. 6—Acquiring Image Statistics Using Low Discrepancy Sampling

Computing the statistics of an image, such as the mean gray-level or standard deviation of gray-levels in an image, is an integral part of many image processing and machine vision applications. Other types of image statistics are required and/or necessary for different applications. The present invention provides an improved method of acquiring image statistics using a reduced number of sample pixels which characterize the image.

Figure 15:
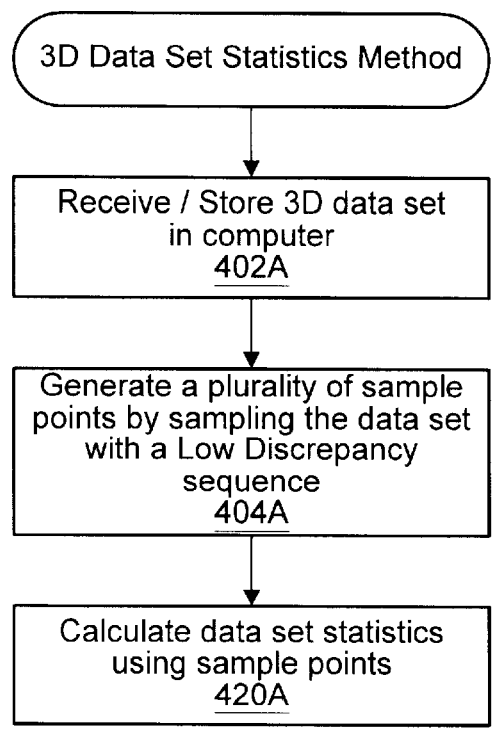
FIG. 15 is a flowchart illustrating a method of acquiring image statistics from a 3D image using a Low Discrepancy sequence.
Figure 16:
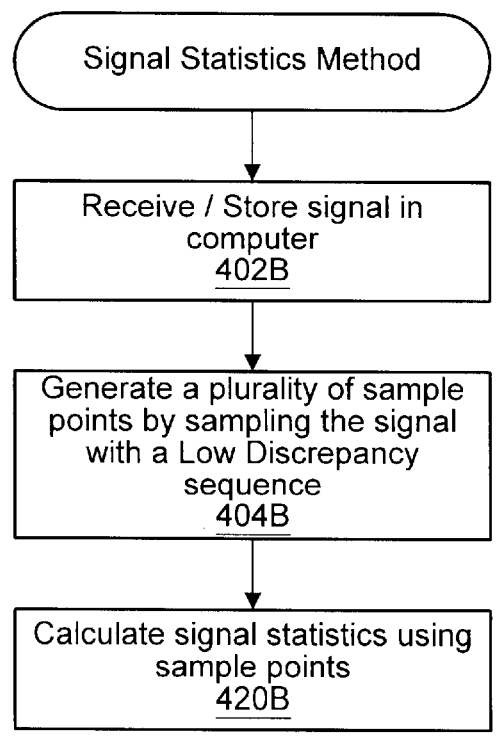
FIG. 16 is a flowchart illustrating a method of acquiring image statistics from a 1D signal using a Low Discrepancy sequence.

FIG. 6 is a flowchart illustrating one embodiment of producing image statistics for an image. As shown in FIGS. 15 and 16, discussed below, the same method may be applied or adapted for generating image statistics for a 3-D image or other 3-D volume or 3D data set, or for a 1-D data set, such as a signal. The present invention may also be readily extended to other n-dimensional data sets.

In step 402 of FIG. 6, the computer 102 receives and stores an image in the computer, through video capture or any other method. The image may be received over a network, or may have been previously stored on the computer, such as by a user. In the case of a 1-D, 2-D, 3-D or n-D data set, the data set is received and stored in step 402A (FIGS. 15 and 16).

In step 404 the image is sampled using a Low Discrepancy sampling method, as described above. The sample pixels are stored in memory in step 405. The number of sample pixels generated may be selected by a user or may be selected by the computer according to some desired accuracy metric. In the case of a 1-D, 2-D, 3-D or n-D data set, the data set is sampled in step 404A (FIGS. 15 and 16) to produce a plurality of sample points which characterize the data set. These sample points are stored in the computer 102.

In step 420 the sample pixels are used to compute various image statistics. More specifically, the computer 102 uses the sample pixels to compute various image statistics according to various statistical gathering algorithms. This embodiment allows the desired pixel or image information (e.g., color, shading, perspective, etc.) to be obtained from the sample pixels, instead of requiring all of the image pixels to be used for this purpose. Because a reduced number of strategically selected sample pixels are used (i.e., sample pixels selected using a Low Discrepancy sequence rather than a grid based, random, or any other selection method), the method's efficiency is improved. In the case of a 1-D, 2-D, 3-D or n-D data set, data set statistics are computed using the sample points in step 420A (FIGS. 15 and 16).

In the absence of Low Discrepancy sampling, either grid-based or random sampling would likely be used to determine sample pixels or points for statistical gathering purposes. Experimental data has been recorded in reference to statistics gathered representing the gray-level in an image using each of these sampling techniques. The experimental data shows that the deviation from real gray-level is always less when sample pixels are selected using a Low Discrepancy sequence rather than grid based algorithms or random selection. Thus, a Low Discrepancy sequence produces better results than grid-based or random selection.

Figures 7, 8:
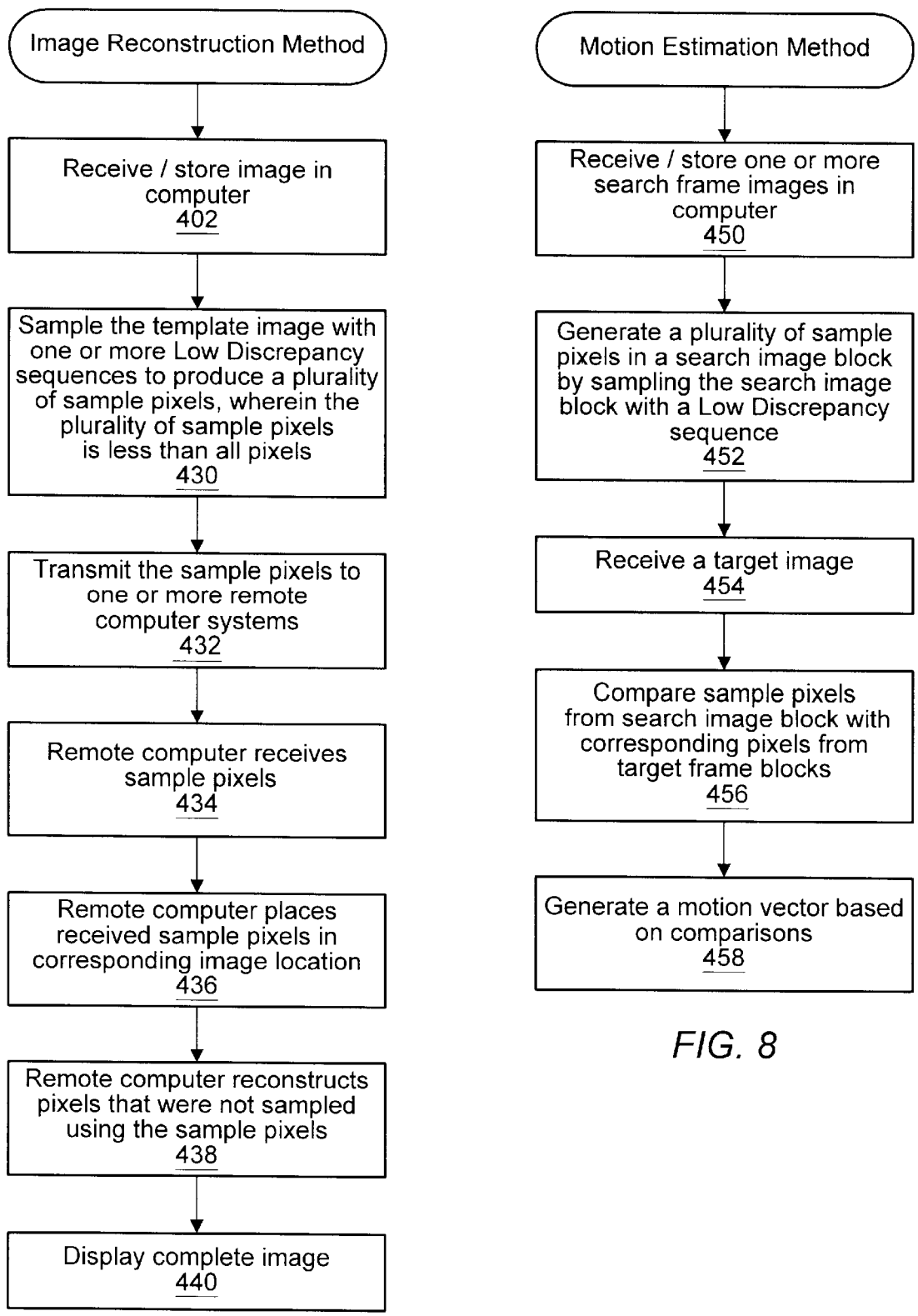
FIG. 7 is a flowchart illustrating a method of image reconstruction using a Low Discrepancy sequence.
FIG. 8 is a flowchart illustrating a method of motion estimation using a Low Discrepancy sequence.

FIG. 7—Reconstructing Images Using Low Discrepancy Sampling

Image reconstruction refers to the process of estimating the values of certain pixels based on the values of a given set of pixels in the image. Applications that require fast transmission of image/graphic data often choose to send less than all of the pixels in an image due to slow transmission speeds. By selecting the best pixels to sample and send, i.e., the subset of pixels which optimally characterize the image, the quality of an image may be greatly improved. The receiving computer system receives the sample pixels and may operate to "fill in the blanks" using surrounding pixel data. This means that if the sample pixels maximally avoid each other, the sample pixels will more accurately characterize or represent the image, and the reconstructed image will look more like the original image.

FIG. 7 is a flowchart illustrating one embodiment of a image reconstruction method. In step 402 an image is received and/or stored by a computer. In a teleconferencing or other similar application, the image may be received from a video camera connected to the computer 102. The computer 102 may also be a web server which stores images for transmission over the Internet.

This image is then sampled in step 430 using a Low Discrepancy sequence. In one embodiment, a plurality of different Low Discrepancy sequences may be used, each for different parts of the image. Thus, portions of the image with more detail, such as a face, can be sampled with a larger number of samples, and portions of the image with less detail can be sampled with a fewer number of samples. Other compression techniques may also be performed on the sample pixel data to increase transmission time.

In step 432 the sample pixels are transmitted to one or more remote computers. For example, the sample pixels may be transmitted over a network, such as the Internet, using any of various transmission protocols.

In step 434 the sample pixels are received by a remote computer. The sample pixels are generally accompanied by coordinate information indicating the location of each sample pixel within the image. Alternatively, the receiving computer may generate the same Low Discrepancy sequence as the transmitting computer to determine placement of the sample pixels. This would avoid the requirement of the server or transmitting computer having to transmit coordinate information with the sample pixels In step 436 the remote computer places the sample pixels in their appropriate locations, such as in a frame buffer.

In step 438 the computer executes an algorithm to fill the pixels that were not received into the frame buffer. The most common method of reconstructing a missing pixel is by averaging each of the pixels around its perimeter, but any other reconstruction method may be used. After the pixels that were not transmitted are reconstructed, in step 440 the computer 102 displays the complete image (i.e. the combination of the received sample pixels and the reconstructed remainder pixels).

The remote computer may begin to refresh the display from the frame buffer as soon as any of the sample pixels are received. As more sample pixels are received and/or reconstructed, the clarity of the image increases.

Reconstruction may also be performed for pixels, or groups of pixels, that were sampled, but were lost or delayed in transmission. For example, in the case of video transmission over the Internet or other network, there is a possibility that packets of image information will be lost, corrupted, or more likely will not reach the destination in time to be used by real time video processors. Nevertheless, the image data that was lost may be reconstructed by estimating the values of the missing pixels. This estimation is typically based on the pixel information of surrounding pixels or the image as a whole. In a real time environment, a method that requires sampling of every pixel may be too slow to use. Therefore a method that provides substantially similar results while saving computer cycles is desirable. The sampling may be performed on the image as a whole or a specified image portion (depending on the specific application) using a Low Discrepancy sequence in order to obtain image information that may be used to reconstruct missing portions of the image. The sampled data may be used to determine an average image color, or any other pixel attribute, which may be used in replacement of missing pixels.

In yet another embodiment, an image may be sent in a pixel-by-pixel format using sample pixels generated by a Low Discrepancy sequence. In other words, the pixels may not be transmitted in a scan line format, e.g., left to right and top to bottom, but rather are transmitted according to a Low Discrepancy sequence ordering. In this embodiment, all of the image pixels may also be sample pixels. The order of sample pixel selection and transfer is determined by a Low Discrepancy sequence. For example, an image being sent across the Internet, pixel-by-pixel (or groups of pixels), is received by a remote computer. As each sample pixel is received, the sample pixel is stored in the frame buffer. On each screen refresh, the current content of the frame buffer is rendered, and the remote computer generates an intermediate or granular representation of the image. Because the pixels maximally avoid one another, at any time during the transfer, the received sample pixels provide the optimal information for viewing or digitally analyzing the image, based on the amount of data received. In other words, according to this embodiment, an image appears according to locations selected by a Low Discrepancy sequence. This may provide the remote user with image information on the entire image more efficiently or more quickly. This embodiment may also provide the best representation of an image where the pixel-by-pixel data was interrupted or stopped. In addition, reconstruction of the received image may be performed in parallel with reception of the sample pixels. In this embodiment, as more pixel samples are received, the received sample pixels may actually overwrite reconstructed pixels.

FIG. 8—Motion Estimation Using Low Discrepancy Sampling

Motion estimation is used in various fields, including the field of compression/decompression of video images. One compression method, which is used in MPEG compression, involves the use of motion vectors. The method is implemented by dividing an image into search blocks. Each search block is compared to blocks of a target image (usually the previous and/or subsequent image in the video sequence) to find the closest match. Once the closest match is found, a motion vector is created to reflect the motion of that particular block. The motion vector is transmitted in place of the search block. Motion vectors may hence be used in the video sequence to compress frames in the video sequence. Other effects may also be applied to the block to indicate changes in color, shade, lighting, etc. Comparing every pixel of a search block to every pixel of the blocks in a target image may be very time and power consuming. A method for reducing computing cycles and time needed to generate motion vectors is desired.

Low Discrepancy sequences may be used to select certain pixels of a search image block to compare with the corresponding pixels of target frame blocks. FIG. 8 illustrates an improved method of generating motion vector using Low Discrepancy sequences.

In step 450 a computer receives and stores one or more search frame images. Each search frame image may comprise multiple search frame blocks. The search frame blocks may be macroblocks of a image being compressed according to the MPEG standard.

In step 452 a search image block is sampled using a Low Discrepancy sequence. This generates a number of sample pixels of the search image block that is less than the total number of pixels in the search image block, As described above, these sample pixels optimally characterize the search image block for the number of sample pixels used.

A target image is then selected or received in step 454. The target image is generally a prior or subsequent frame to the search image. The target image includes various image blocks that will be compared to the search image block to determine the best match.

The sample pixels from the search image block are then used to compare with various target image blocks from the target image in step 456. Once the closest match has been located within the target frame blocks, in step 458 a motion vector is generated which encodes this information. This process may be repeated for every search image block. This method can be used to create motion vectors more quickly than conventional methods.

An alternative embodiment of motion estimation is used in machine vision systems. In many applications it is necessary for a machine vision system to cope with moving and changing objects, changing illumination, and changing viewpoints, as the application requires information extracted from a dynamic environment. A sequence of image frames contains much more information to the understanding of a scene, but at the expense of larger amounts of data to be processed. Estimating the motion of objects or the scene in successive acquired images is therefore desirable. Since motion estimation is most valuable if done in real-time, if every pixel of two sequential images is compared, the data processing load is tremendous and may produce useless delayed results due to computational lag or require a higher delay time between images. Therefore, utilizing sample pixels of acquired images may give an accurate analysis of changing conditions while minimizing precious computer cycles. Historically, images were sampled using grid based patterns or random patterns. Using Low Discrepancy sequences, however, provides improved results, or provides the same results while requiring fewer sample pixels to be used.

Figure 8A:
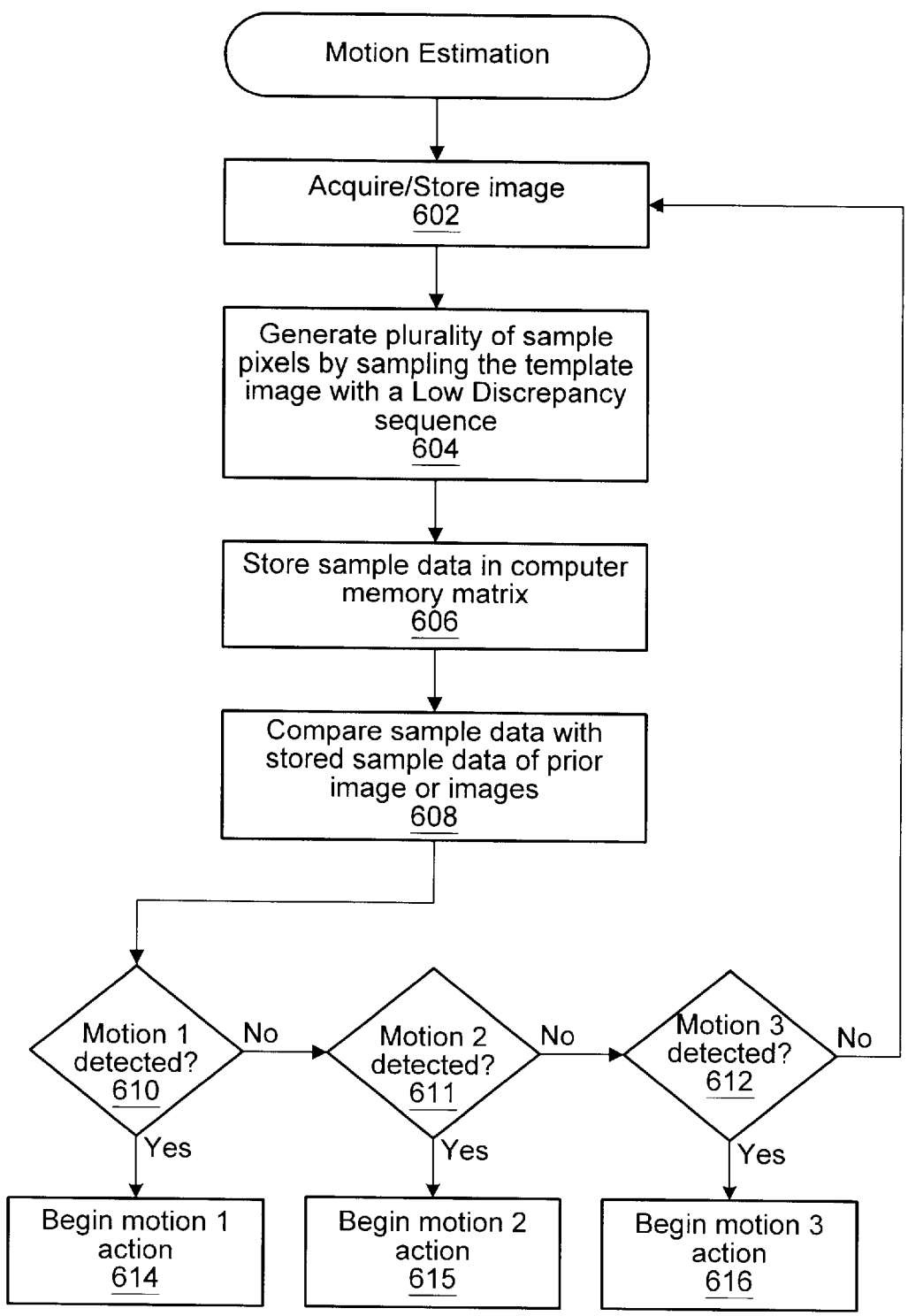
FIG. 8A is a flowchart illustrating a second type of motion estimation using a Low Discrepancy sequence.

One embodiment of motion estimation is illustrated in the flowchart of FIG. 8A. In step 602 an image of the pertinent scene or object is acquired. This image is sample in step 604 using a Low Discrepancy sequence. The sample data may be stored in a memory matrix 606 so it may be referred to by future comparison operations. A storage matrix is preferred if comparisons are to be made between more than directly neighboring images. The stored sample data is compared to prior image data to determine if certain motions have occurred or are expected to occur. Steps 610–612 allow a plurality of motions to be detected or anticipated and to make the appropriate adjustments (614–616). This sequence is repeated, beginning at step 602 by acquiring the next image, as long as necessary. This method may be implement, but is not limited to, the fields of robot navigation, autonomous vehicles, video coding, obtaining the structure of objects from motion, and tracking objects.

FIG. 9—Object Location Using Low Discrepancy Sampling

Object location refers to the process of quickly locating the position of a known object in an image. For example, finding the location of a black square on a white background. Assuming an ideal black square (i.e. all black pixels are connected and there are no gaps between black pixels), the task can be accomplished by finding one black pixel, from which the location of the complete square can be determined.

FIG. 9 illustrates the process of object location. In step 460 the target image (the image to be searched) is acquired and stored in the computer. In step 462 one or more template pixels are acquired and/or selected. In the example of a search for an ideal black square, the template pixel may be a single black pixel. It is noted that step 462 may occur before or after step 460.

In step 464 a location on the target image is generated using a Low Discrepancy sequence. In step 466 the template pixel information (a black pixel in the example) is compared to the pixel information at the generated location on the target image. In step 468 the method then determines if the pixel information matches. If so, the object from which the template pixel was taken has been found. If there is no match, step 464 generates a new location on the target image using the Low Discrepancy sequence and the comparison process of steps 464 and 468 is repeated.

It is noted that the method described above can be easily modified for more complex object location problems.

When this method was tested using Halton and Sobol Low Discrepancy sequences, both outperformed random and grid based sequences when locating an ideal black box on a white background. While experimental results state that Halton and Sobol sequences prefer the two main orientations in the x and y direction, even if the box is rotated, the Low Discrepancy sequences still perform better than both random sequences and grid based sets.

Figure 11:
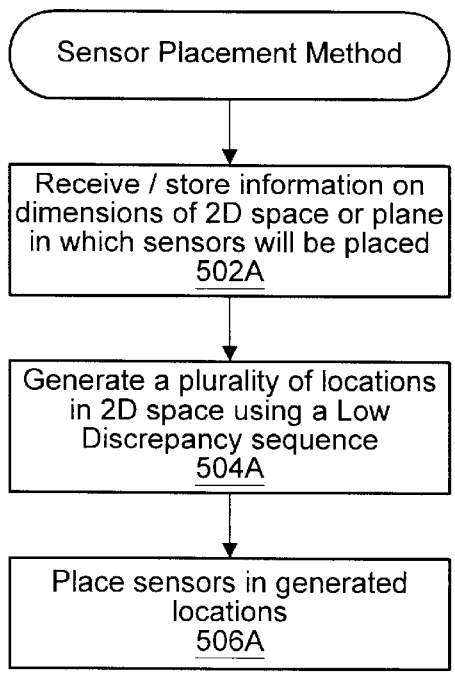
FIG. 11 is a flowchart illustrating a method of placing sensors within a determined spatial area using a Low Discrepancy sequence.
Figure 14:
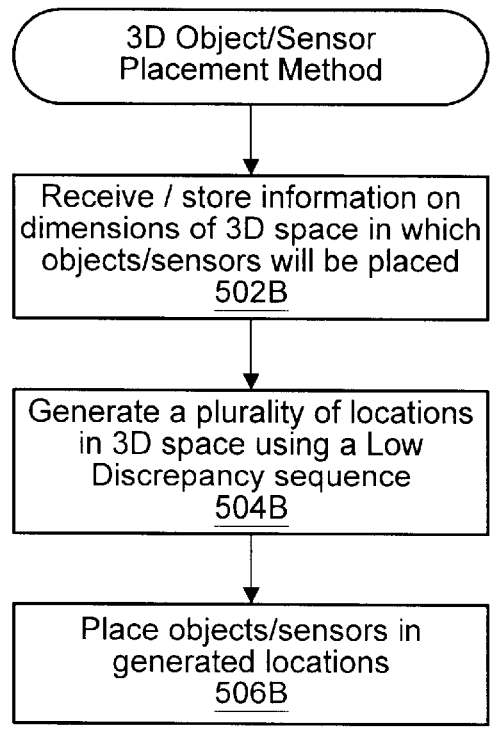
FIG. 14 is a flowchart illustrating a method of placing sensors within a determined three dimensional spatial area using a Low Discrepancy sequence.

FIGS. 10, 11 and 14—Determining Locations for Object/Sensor Placement Using Low Discrepancy Sequences An application that requires the placement of objects for best coverage of an area, and/or which requires great effort in placing additional objects, and/or which requires considerable resources in the moving/setting up of objects, may benefit by the use of Low Discrepancy sequences for determining the placement of such objects. For example, in many applications multiple sensors are required, such as in a 2D array or 3D volume, to cover the area and receive signals in the area. Therefore, a method for placing sensors optimally in the area may allow a measurement to be completed with fewer sensors than required by a grid based placement.

FIG. 10 is a flowchart illustrating a method of placing objects within a determined spatial area (e.g., a 2-D area)

using a Low Discrepancy sequence. FIG. 10 illustrates that the method of the present invention may be used for placing or locating any of various types of objects using a Low Discrepancy sequence. FIG. 11 is a flowchart illustrating a method of placing sensors within a determined spatial area using a Low Discrepancy sequence. For example, the sensors may be temperature sensors, pressure sensors, electrical sensors, microphones, transmitters, receivers, radar receivers, sonar receivers, and any other type of sensor or transducer. FIG. 14 illustrates the method of placing objects or sensors within a 3-dimensional volume using a Low Discrepancy sequence. Each of FIGS. 10, 11 and 14 is described below.

As shown in FIG. 10, in step 502 the method first receives the dimensions of the 2-dimensional area (or 3D volume or 1D space) in which the object (or sensor) will be placed. Where the object is a sensor, the method receives information regarding the 2-D area or 3-D volume in which the sensor can be placed in step 502A (FIG. 11). In the case of a 3-D application, the method receives information regarding the 3-D volume in step 502B (FIG. 14). This information may be received from a user or may be generated by the computer 102 in response to other information.

In step 504 (or steps 504A or 504B) the method generates placement locations in the 2-D space (FIG. 10) or 3-D volume (FIG. 14) using a Low Discrepancy sequence. The number of values or elements in the Low Discrepancy sequence corresponds to the determined number of objects or sensors to be placed. Step 504 may involve generating the Low Discrepancy sequence, wherein the sequence indicates or specifies the placement locations. If the objects or sensors are being placed in a 2-D area, as in FIGS. 10 and 11, the method generates a 2-D Low Discrepancy sequence. If the objects are being placed in a 3-D area, as in FIG. 14, the method generates a 3-D Low Discrepancy sequence. Alternatively, the Low Discrepancy sequence may have been previously generated and stored.

In step 506 (or steps 506A or 506B) the objects or sensors are then placed in the generated or determined locations. The objects or sensors may be placed using robotics or other types of machinery, or may be placed by a human. For example, in the manufacture of a sensor comprising a number of sensor elements, robotics or machinery may manufacture the sensor with the sensor elements placed in the locations generated by the Low Discrepancy sequence. Alternatively, if the majority of possible object locations will be filled with objects, a smaller Low Discrepancy sequence may be generated to determine where objects will not be placed. The objects, placed according to the Low Discrepancy sequence, may provide improved results as compared to a system using objects placed in a grid based or random pattern.

Figure 12:
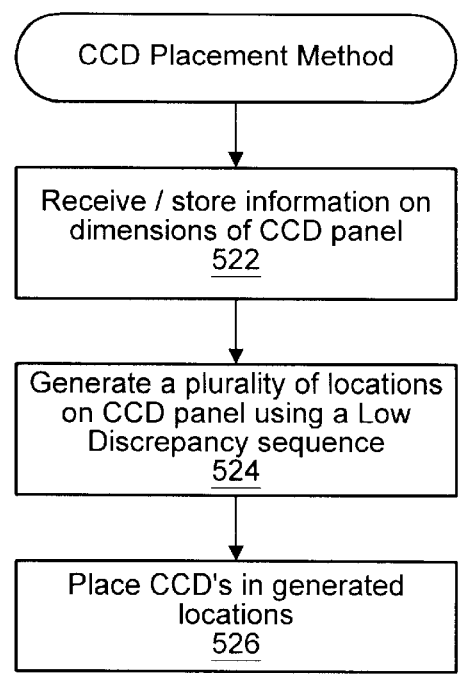
FIG. 12 is a flowchart illustrating a method of placing CCD sensors within a determined spatial area using a Low Discrepancy sequence.

FIG. 12—CCD Placement Method

Figure 12A:
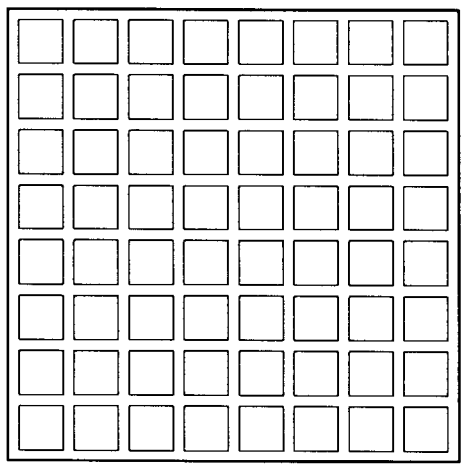
FIG. 12A is an example of CCD sensor elements placed using a grid based pattern.
Figure 12B:
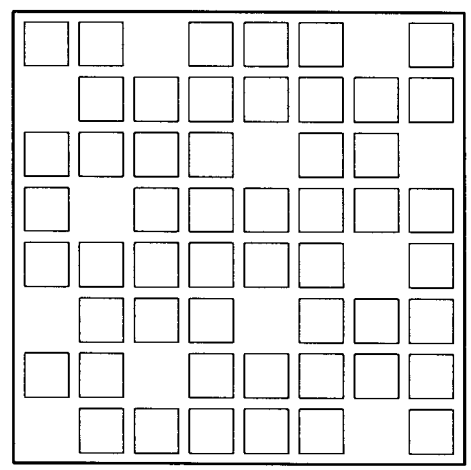
FIG. 12B is an example of CCD sensor elements placed using a Low Discrepancy sequence.

A Charge-Coupled Device (CCD) sensor is one example of the use of the sensor placement method of the present invention. A typical CCD sensor, such as in a camera, is actually an array of CCD sensor elements. These sensor elements are typically combined in a grid based pattern, as shown in FIG. 12A. A grid based pattern placement of these sensor elements may provide accurate results, but considering the cost of the sensor elements, it is desirable to utilize fewer sensors than required by a grid based placement, while still providing similar or better effectiveness. Alternatively, it is desirable to utilize the same number of sensors as a grid based placement, while providing improved results. According to the present invention, the CCD sensor elements may be placed or configured according to a Low Discrepancy sequence.

FIG. 12 is a flowchart diagram illustrating placement of the individual sensor elements of a CCD using a Low Discrepancy sequence. The method operates by first receiving the dimensions of the CCD panel from the user in step 522. In step 524 placement locations are generated using a Low Discrepancy sequence comprising a determined number of sequence elements or results (the number of sensor elements to be used). Here the computer 102 generates a Low Discrepancy sequence, and then determines placement locations using the Low Discrepancy sequence. The sensor elements are then placed in the optimal locations in step 526. The sensor elements may be placed by the user or by machinery during manufacture of the CCD panels. The sensor elements, placed according to the Low Discrepancy sequence, provide better results than a system which uses sensor elements in a grid based pattern.

Figure 13:
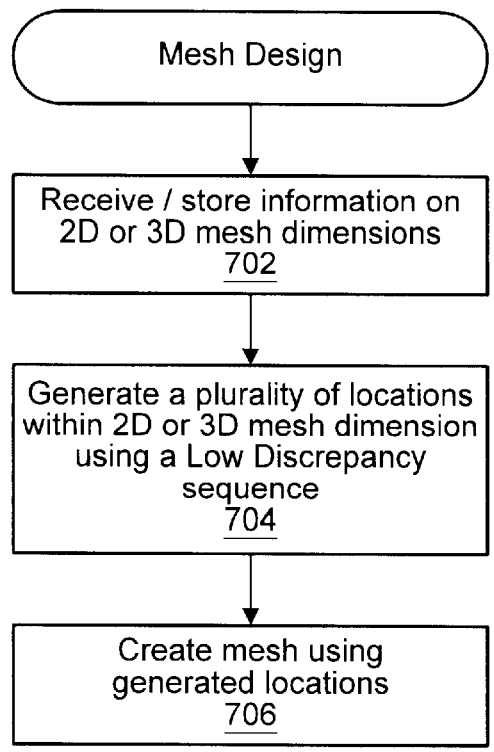
FIG. 13 is a flowchart illustrating a method of generating a mesh using a Low Discrepancy sequence.

FIG. 13—Mesh Design Using Low Discrepancy Sequences

Meshes are used by many engineering applications including mechanical, structural, and design applications. Prior art typically uses a grid based mesh. If a mesh could be generated using less vertices, while achieving substantially the same results, efficiency my be increased. In addition, it would also be desirable to generate a mesh with improved results over a grid based mesh. Therefore an improved method for determining mesh vertices is desired.

FIG. 13 illustrates a method for creating meshes using Low Discrepancy sequences. In step 702 the computer receives the dimension of either a 2D or 3D mesh. In step 704 the vertex locations are generated, within the 2D or 3D dimensions, by a Low Discrepancy sequence. These vertices are then combined in step 706 to create a fall mesh of the desired dimension.

FIGS. 15 and 16—Acquiring Data Set Statistics Using Low Discrepancy Sampling

Computing the statistics of a data set, such as a 1-D, 2-D, 3-D or n-D data set, is often required. For example, computing the statistics of a signal may be an important aspect of many applications involving signals from sensors. For example, a voice recognition system is required to produce statistics regarding a voice signal in order to build a database from which to match future voice data. Theses signal are typically acquired as a voltage signal from a microphone and stored in the computer memory. If a fewer number of signal samples are stored in memory, the recognition process may be faster and more efficient. Low Discrepancy signal sampling may also by used in any application dealing with sound, vibration, acceleration, spectral matching, signal matching, frequency estimation, and dynamic signal measuring.

FIGS. 15 and 16 are flowcharts illustrating embodiments of producing statistics for a data set. The same method may be applied or adapted for generating statistics for any type of n-D data set, such as a 2-D or 3-D image, a 3-D volume or other 3-D data set, or for a 1-D data set, such as a signal. The present invention may also be readily extended to other n-dimensional data sets. FIGS. 15 and 16 are described together below.

In step 402A of FIG. 15, the computer 102 receives and stores a data set in the computer. The data set may be received over a network, or may have been previously stored on the computer, such as by a user. In the case of a 1-D data set, e.g., a signal, the signal is received and stored in step 402B (FIG. 16).

In step 404A of FIG. 15, the data set is sampled using a Low Discrepancy sampling method. The sample points are preferably stored in memory. The number of sample points generated may be selected by a user or may be selected by the computer according to some desired accuracy metric. In the case of a 1-D data set, e.g., a signal, the data set of the signal is sampled in step 404B (FIG. 16) to produce a plurality of sample points which characterize the signal.

In step 420A the sample points are used to compute various data set statistics. More specifically, the computer 102 uses the sample points to compute various statistics according to various statistical gathering algorithms. This embodiment allows the desired statistical information to be obtained from the sample points, instead of requiring all of the data set points to be used for this purpose. Because a reduced number of strategically selected sample points are used (i.e., sample points selected using a Low Discrepancy sequence rather than a grid based, random, or any other selection method), the method's efficiency is improved. In the case of a 1-D data set, e.g., a signal, data set statistics are computed using the sample points of the signal in step 420B (FIG. 16).

In the absence of Low Discrepancy sampling, either grid-based or random sampling would likely be used to determine sample points for statistical gathering purposes. Experimental data has shown that a Low Discrepancy sequence produces better results than grid-based or random selection.

Although the system and method of the present invention is described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A computer-implemented method for characterizing an image, the method comprising:
   receiving the image, wherein the image comprises a first plurality of pixels;
   sampling the image using a Low Discrepancy sequence to determine a plurality of sample pixels in the image which characterize the image; and
   storing the plurality of sample pixels in a memory of the computer system, wherein the plurality of sample pixels characterize the image.

2. The method of claim 1, wherein the Low Discrepancy sequence is a quasi-random sequence.

3. The method of claim 1, wherein the Low Discrepancy sequence is designed to produce sample points which maximally avoid each other.

4. The method of claim 1, wherein said Low Discrepancy sequence sampling results in fewer points to characterize the image than a uniform or random sequence.

5. The method of claim 1, wherein the Low Discrepancy sequence is a Halton sequence.

6. The method of claim 1, wherein the Low Discrepancy sequence is a sequence selected from the group comprising: Halton, Sobol, Faure, and Niederreiter.

7. The method of claim 1, wherein said sampling the image using a Low Discrepancy sequence comprises:
   generating the Low Discrepancy sequence;
   selecting pixels in the image using the Low Discrepancy sequence to determine a plurality of sample pixels in the image which characterize the image.

8. The method of claim 1, further comprising:
   receiving user input indicating a desired granularity of an image characterization;
   wherein the method generates a number of sample pixels based on the desired granularity of the image characterization.

9. The method of claim 1,
   wherein the image is a template image used in pattern matching;
   the method further comprising:
     receiving a target image;
     comparing the sample pixels in the template image with pixels in the target image to determine one or more instances of the template image in the target image.

10. The method of claim 1, further comprising:
    determining image statistics based on the sample pixels.

11. The method of claim 1, wherein said sampling the image and said storing the plurality of sample pixels are performed by a first computer system;
    the method further comprising:
      the first computer system transmitting the sample pixels to a second computer system over a network;
      the second computer system displaying the sample pixels.

12. The method of claim 11, further comprising:
    the second computer system reconstructing pixels from the image which were not received, wherein said reconstructed pixels are displayed with the sample pixels to display a more complete image.

13. The method of claim 1,
    wherein the image is a search image used in motion estimation;
    the method further comprising:
      receiving a target image;
      comparing the sample pixels in the search image with pixels in the target image to determine a motion vector.

14. A system for characterizing an image, wherein the image comprises a first plurality of pixels, the system comprising:
    a memory which stores the image, wherein the image comprises a first plurality of pixels;
    a processor coupled to the memory which is operable to sample the image using a Low Discrepancy sequence to determine a plurality of sample pixels in the image which characterize the image;
    wherein the memory is operable to store the plurality of sample pixels, wherein the plurality of sample pixels characterize the image.

15. The system of claim 14, wherein the Low Discrepancy sequence is a quasi-random sequence.

16. The system of claim 14, wherein the Low Discrepancy sequence is designed to produce sample points which maximally avoid each other.

17. The system of claim 14, wherein said Low Discrepancy sequence sampling results in fewer points to characterize the image than a uniform or random sequence.

18. The system of claim 14, wherein the Low Discrepancy sequence is a sequence selected from the group comprising: Halton, Sobol, Faure, and Niederreiter.

19. The system of claim 14, wherein the system is a machine vision system.

20. The system of claim 14,
    wherein the processor is operable to generate the Low Discrepancy sequence;
    wherein the processor selects pixels in the image using the generated Low Discrepancy sequence to determine a plurality of sample pixels in the image which characterize the image.

21. The system of claim 14, wherein the image is a template image used in pattern matching;

wherein the system further includes an input for receiving a target image;

wherein the processor is operable to compare the sample pixels in the template image with pixels in the target image to determine one or more instances of the template image in the target image.

22. The system of claim 14, wherein the processor is operable to determine image statistics based on the sample pixels.

23. The system of claim 14, wherein the image is a search image used in motion estimation;

wherein the system further includes an input for receiving a target image;

wherein the processor is operable to compare the sample pixels in the template image with pixels in the target image to determine a motion vector.

24. The system of claim 14, further comprising:

a transmitter coupled to the memory which is operable to transmit the sample pixels to a second computer system over a network;

wherein the second computer system is operable to display the sample pixels.

25. A system for transmitting an image, the system comprising:

a first computer system, comprising:
a memory which stores the image, wherein the image comprises a first plurality of pixels;
a processor coupled to the memory which is operable to sample the image using a Low Discrepancy sequence to determine a plurality of sample pixels in the image which characterize the image;
a transmitter coupled to the memory which is operable to transmit the sample pixels over a network;

a second computer system coupled to the first computer system over the network, comprising:
an input for receiving the sample pixels; and
a display for displaying the sample pixels.

26. The system of claim 25, wherein the second computer system is operable to reconstruct pixels from the image which were not received, wherein said reconstructed pixels are displayed with the sample pixels to display a more complete image.

27. A memory medium which comprises program instructions for characterizing an image, wherein the image comprises a first plurality of pixels, wherein the program instructions are executable to implement:

sampling the image using a Low Discrepancy sequence to determine a plurality of sample pixels in the image which characterize the image; and storing the plurality of sample pixels in a memory of the computer system, wherein the plurality of sample pixels characterize the image.

28. The memory medium of claim 27, wherein the Low Discrepancy sequence is a quasi-random sequence.

29. The memory medium of claim 27, wherein the Low Discrepancy sequence is designed to produce sample points which maximally avoid each other.

30. The memory medium of claim 27, wherein said Low Discrepancy sequence sampling results in fewer points to characterize the template image than a uniform or random sequence.

31. The memory medium of claim 27, wherein the Low Discrepancy sequence is a sequence selected from the group comprising: Halton, Sobol, Faure, and Niederreiter.

32. The memory medium of claim 27, wherein the image is a template image used in pattern matching;

wherein, in response to a received target image, the program instructions are further executable to implement:
comparing the sample pixels in the template image with pixels in the target image to determine one or more instances of the template image in the target image.

33. The memory medium of claim 27, wherein the program instructions are further executable to implement:

determining image statistics based on the sample pixels.

34. The memory medium of claim 27, wherein said sampling the image and said storing the plurality of sample pixels are performed by a first computer system;

wherein the program instructions are further executable to implement:
transmitting the sample pixels to a second computer system over a network;
wherein the second computer system is operable to display the sample pixels.

35. The memory medium of claim 27, wherein the image is a search image used in motion estimation;

wherein, in response to a received target image, the program instructions are further executable to implement:
comparing the sample pixels in the search image with pixels in the target image to determine a motion vector.

36. A computer-implemented method for placing sensors in an area for coverage of the area, the method comprising:

generating a Low Discrepancy sequence;

placing the sensors at locations in the area according to the Low Discrepancy sequence.

37. The method of claim 36, wherein the area is a 2-dimensional area.

38. The method of claim 36, wherein the area is a 3-dimensional volume.

39. The method of claim 36, further comprising:

receiving information on the area in response to user input, wherein said information includes dimensions of the area;

wherein said generating the Low Discrepancy sequence is performed based on said information.

40. The method of claim 36, wherein the area is determined by the computer based on the type and number of sensors to be placed.

41. The method of claim 36, wherein the Low Discrepancy sequence is a quasi-random sequence.

42. The method of claim 36, wherein the Low Discrepancy sequence is designed to produce sample points which maximally avoid each other.

43. The method of claim 36, wherein the Low Discrepancy sequence is a sequence selected from the group comprising: Halton, Sobol, Faure, and Niederreiter.

44. A computer-implemented method for placing sensors in an area for coverage of the area, the method comprising:

receiving information on the area in response to user input, wherein said information includes dimensions of the area;

generating a Low Discrepancy sequence, wherein the Low Discrepancy sequence is generated based on said information;

placing the sensors at locations in the area according to the Low Discrepancy sequence.

45. A computer-implemented method for constructing a CCD sensor comprising a plurality of CCD sensor elements, the method comprising:

generating a Low Discrepancy sequence, wherein elements of the Low Discrepancy sequence indicate locations of the CCD sensor elements;

constructing the CCD sensor, wherein said constructing includes placing the CCD sensor elements at locations in the CCD sensor according to the Low Discrepancy sequence.

46. A computer-implemented method for constructing a CCD sensor, the method comprising:

generating a Low Discrepancy sequence;

placing CCD sensor elements at locations in the CCD sensor according to the Low Discrepancy sequence.

* * * * *